US005536289A

United States Patent [19]

Spies et al.

[11] Patent Number: 5,536,289

[45] Date of Patent: Jul. 16, 1996

[54] GAS-LIQUID SEPARATOR

[75] Inventors: Karl-Heinz Spies, Birkenau; Wolfgang Krause, Waibstadt, both of Germany

[73] Assignee: Firma Carl Freudenberg, Weinheim, Germany

[21] Appl. No.: 388,001

[22] Filed: Feb. 13, 1995

[30] Foreign Application Priority Data

Feb. 15, 1994 [DE] Germany .......................... 44 04 709.6

[51] Int. Cl.[6] ........................................ B01D 45/12

[52] U.S. Cl. ........................................ 55/459.5; 55/418

[58] Field of Search ........................................ 55/418, 459.1, 55/459.5; 95/22

[56] References Cited

U.S. PATENT DOCUMENTS 3,513,642 5/1970 Cornett ........................................ 55/418
4,135,897 1/1979 Gondek ........................................ 55/418
4,225,325 9/1980 Diehl et al. ........................................ 55/418
4,976,872 12/1990 Grey ........................................ 55/459.5

*Primary Examiner*—Robert J. Warden
*Assistant Examiner*—Theresa T. Snider
*Attorney, Agent, or Firm*—Kenyon & Kenyon

[57] ABSTRACT

A liquid separator for the separation of liquids from gases is disclosed. The separator has an inlet orifice for receiving a flow of the gas laden with liquid, a first outlet for the liquid and a second outlet for the gas liberated from the liquid, and an adjusting mechanism for varying the available cross-sectional area arranged in the inlet orifice. The inlet orifice has a tubular passage cross-section and is bounded along its entire length by a dimensionally fixed wall. The adjusting mechanism has a pressure control assembly having a pneumatically operable control element which is arranged within the inlet orifice in a manner allowing relative movement therewith.

10 Claims, 2 Drawing Sheets

GAS-LIQUID SEPARATOR

BACKGROUND OF THE INVENTION

The present invention pertains generally to a liquid separator for the separation of liquids from gases, and particularly to one of the type comprising an inlet orifice for a liquid laden with gas, a first outlet and a second outlet for the separated gas and liquid respectively, and an adjusting mechanism for varying the passage cross-section characteristic of the inlet orifice.

Such a liquid separator is known from DE 31 28 470 C2. This reference discloses a liquid separator that is provided in the form of a cyclone oil separator for use with the crankcase ventilation of internal combustion engines. It has an inlet orifice whose wall is formed by a spring and which is adjustable so as to permit the reduction of the associated passage cross-section. The adjusting mechanism, which forms a section of the wall, consists of a flexible material, for example, spring steel. In devices of this type, one seeks to provide for the uniformly good separation of gas from liquid, largely independent of the load state of the associated combustion engine. The spring stiffness of the flexible wall section in the disclosed device adjusts to the incoming volumetric flow in a way that continually provides the necessary vortex velocity and the centrifugal force necessary for gas-liquid separation. However, the working properties of liquid separators of this type are far less than optimal, as the potential adjusting power due to the fluid motion is minimal. Consequently, the flexible material of the adjusting mechanism must be designed to be correspondingly soft and unstable. This design compromise makes it very difficult to provide for the stable positioning of the adjusting mechanism.

There remains a need for the further development of a gas-liquid separator of the previously known type such that its adjusting mechanism has improved working properties and malfunctions of the adjusting mechanism are reliably avoided. There remains a need to further develop such a separator so that it achieves good separation efficiency with negligible pressure losses.

SUMMARY OF THE INVENTION

The invention meets these needs by providing two embodiments of a gas-liquid separator: a first embodiment for use in the crankcase ventilation of a turbo diesel type combustion engine to separate liquids from gases; and a second embodiment for use in an Otto cycle type combustion engine. Each of the liquid separators includes an inlet orifice having a passage that has a rectangular cross-section, leading to a cyclone having a first outlet for the separated liquid and a second outlet for the gas liberated from the liquid. To vary the passage cross-section, an adjusting mechanism, which comprises a pressure assembly, is arranged within the inlet orifice. A pneumatically operable control element for adjusting the passage cross-section that penetrates the inlet orifice in a gas-tight manner is arranged within the inlet orifice in a manner allowing relative movement therewith, and to so form a variable constriction in it.

In the embodiment configured for use with a turbo diesel combustion engine, the pressure assembly is provided with a high pressure connection, so that the available boost pressure from the turbocharger can be effectively applied against the spring tension provided by a helical spring. A chamber in which the helical spring is arranged is charged with atmospheric pressure through a vent opening within the housing. When the combustion engine is running at idling speed, the control element opens to provide an opening having a cross-section through the inlet orifice of minimal area.

In a second embodiment, the pressure assembly is provided with a vacuum connection that is connected to a chamber on the side facing and in pneumatic communication with the helical spring. The vacuum connection is connected to the induction pipe of an Otto combustion engine operating in full-throttle state. The chamber adjacent to the diaphragm is charged with atmospheric pressure. In the full-throttle state, the cross-sectional area through the inlet orifice is of maximum area.

BRIEF DESCRIPTION OF THE DRAWINGS

For a more complete understanding of this invention, reference should now be made to the embodiments illustrated in greater detail in the accompanying drawings and described below. In the drawings.

DETAILED DESCRIPTION

Figure 1:
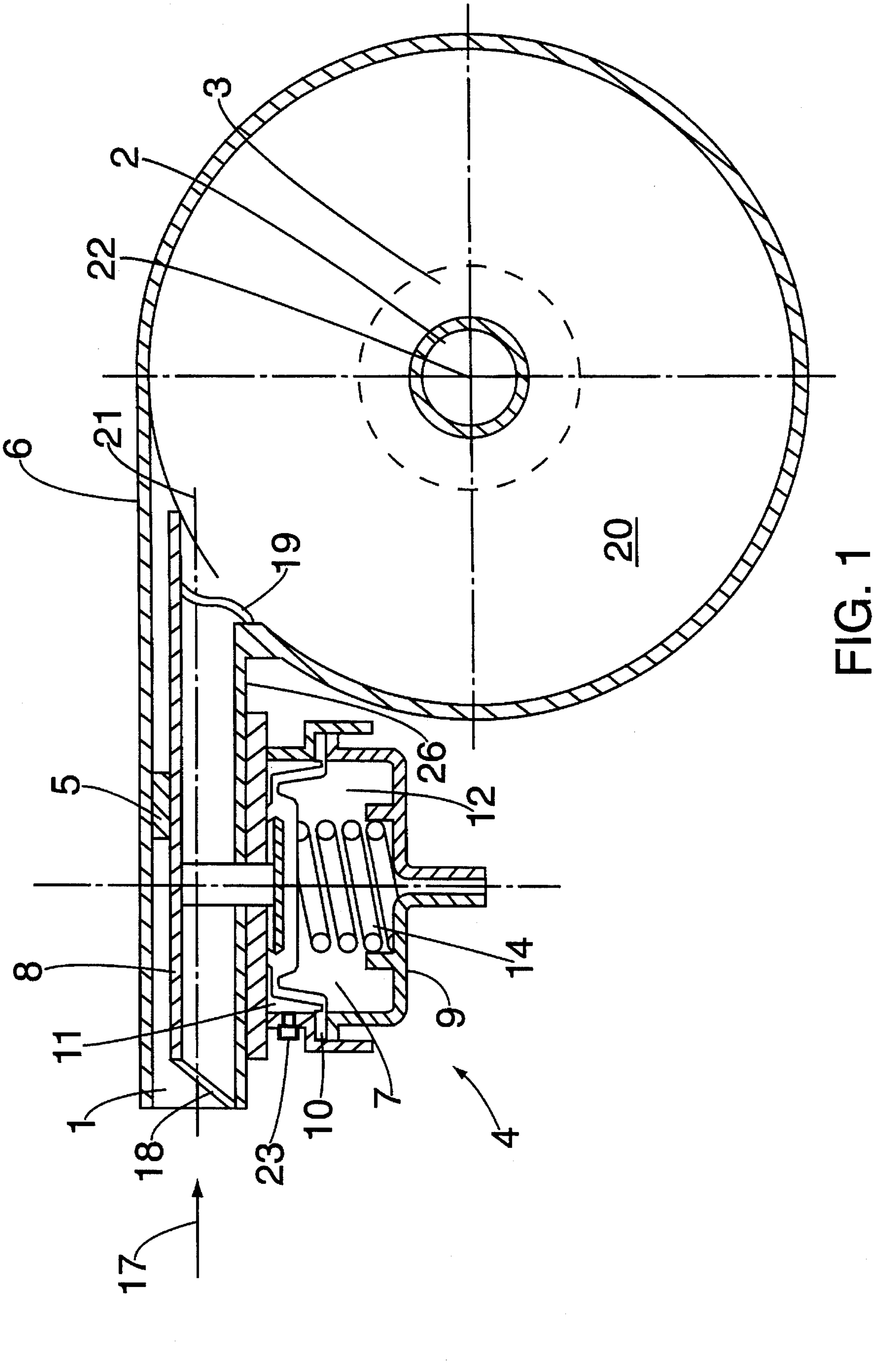
FIG. 1 is a sectional view of an embodiment of a liquid separator used as an oil separator in the crankcase ventilation of a turbo diesel combustion engine. In this example, the liquid separator is shown in the case where the engine is idling.

In the gas-liquid separator of the invention, an inlet orifice 1 is provided that is partially bound by a tubular passage running along its entire length by a fixed wall 6. The remainder of the passageway is bounded by a shiftable control element 8. An adjusting mechanism 4 comprising a pressure control assembly connected to the pneumatically shiftable control element 8 is arranged with respect to the inlet orifice in a manner allowing relative movement of the control element therewith. By activating the adjustment mechanism to move the position of the control element 8, the cross-sectional area 5 of the inlet orifice 1 is continually adjusted in accordance with the respective load state of the associated engine. The pneumatically operable control element of the adjusting mechanism 4 is protected from external influences by the dimensionally stable wall 6. Its movement is precisely controlled within the inlet orifice in dependence upon the conditions imposed by the application at hand. By means of the non-automatically adjustable control element 8 (in comparison with the automatic adjustment provided in DE 31 28 470 C2), unwanted changes in the passage cross-section can reliably be avoided. Moreover, the pneumatically operable control element 8 enables the movement of the adjusting mechanism to be adjusted, whether to the rotational speed and/or to the load state of an associated combustion engine. By suitably arranging the control element 8 within the inlet orifice, malfunctions of the adjusting mechanism are reliably prevented.

The pressure assembly 7 which drives the control element comprises a housing 9 that encloses two chambers 11 and 12. These chambers are separated from each other in a gas-tight manner by a rolling diaphragm 10 made of elastomeric material. As illustrated in FIG. 1, the diaphragm is joined to the control element 8 on one side and is supported on a helical spring 14 on its other side. Both chambers are capable of being charged with pressures differing from each other to permit the pneumatic actuation of the control element 8. The pressure control assembly is arranged externally on the wall of the inlet orifice 1. The associated control element 8 penetrates the wall in a gas-tight manner via sealing members 18 and 19. The inlet orifice 1 and the adjusting mechanism 4 can be designed as a unit which can be preassembled and flange-mounted together on the actual separator.

The helical spring 14 is arranged inside the housing 9 and configured to be actuable so that, in case of a disturbance in the pneumatic actuator, the control element opens to provide a passage having a relatively larger cross-sectional area through the inlet orifice 1. A helical spring is employed here because in comparison with other kinds of spring elements, helical springs have the advantage that they are inexpensive, are available in many sizes, and do not exhibit any settling phenomena over a long service life. The control characteristic of the adjusting mechanism is therefore always of consistent quality.

The shape of the control element 8 can be basically flat and plate-like. The sealing of the relatively movable control element within the inlet orifice is substantially simplified by the use of flat inner walls, since the relative allocation of the peripheral-side boundary of the control element relative to the neighboring adjoining inside wall of the inlet orifice, irrespective of the magnitude of the pressurization and the position of the control element, does not vary.

The control element and/or the inner wall 26 of the inlet orifice can be provided with at least one sealing element. The sealing element is bounded on one side by one surface of the control element and on its other side by the adjacent inner wall 26 of the inlet. The sealing element links the control element 26 to the inner wall in an essentially gas-tight manner so that there can be no flow circumventing the passage defined by the control element. The sealing elements can be arranged so that, within the rectangularly designed passage cross-section, an essentially rectangular designed control element is arranged having sealing strips 18 diagonal to the direction of flow 17 of the liquid-laden gas. These sealing strips are in contact with the adjacent inner walls of the inlet orifice, making a seal therewith. On the opposite side of the control element 8 is provided an elastically flexible, roller-membrane-like element 19 having oncoming-flow surfaces and flow-off surfaces to complete the seal of the control element with respect to the inner wall. In further embodiments, the flow-off surfaces can be designed to be elastically flexible, corresponding to the control travel. To effect a proper seal, each of these seals is tightly joined to the inner wall. For example, by vulcanization, the sealing strips can be premolded directly onto the peripheral side boundary of the control element, or secured to the control element using secondary aids.

In the illustrated embodiments the inlet orifices lead to a cyclone 20, the cyclone having a first outlet 2 that, in cross-section, diminishes in size in a stepwise manner. The axes 21 and 22 of the inlet orifice 1 and the cyclone 20 are essentially perpendicular to one another. When the liquid-laden gas is channeled through the inlet orifice 1 into the cyclone 20 and swirled along the inner peripheral-side boundary, the liquid and gas efficiently separate from one another with little pressure loss.

To actuate the control element, the pressure assembly 7 is provided with a high pressure connection port 23, which is connected to the chamber 11 on the side of the diaphragm 10 facing away from the helical spring 14. This structure is particularly useful when the liquid separator is used as an oil separator in the crankcase ventilation of a turbo diesel combustion engine, as in FIG. 1. In this case, the adjustment of the passage cross-section by means of the control element takes place to a great extent contingent upon the boost pressure of the super charger. At full throttle, when a comparatively high boost pressure is available, the control element 8 is moved against the spring tension of the helical compression spring 14 within the inlet orifice so as to maximize the passage cross-section. On the other hand, when the combustion engine is running in the idling range or at partial throttle, there is comparatively lower boost pressure available to actuate the adjusting mechanism. In this case the available passage cross-section through the inlet orifice will be comparatively smaller.

Figure 2:
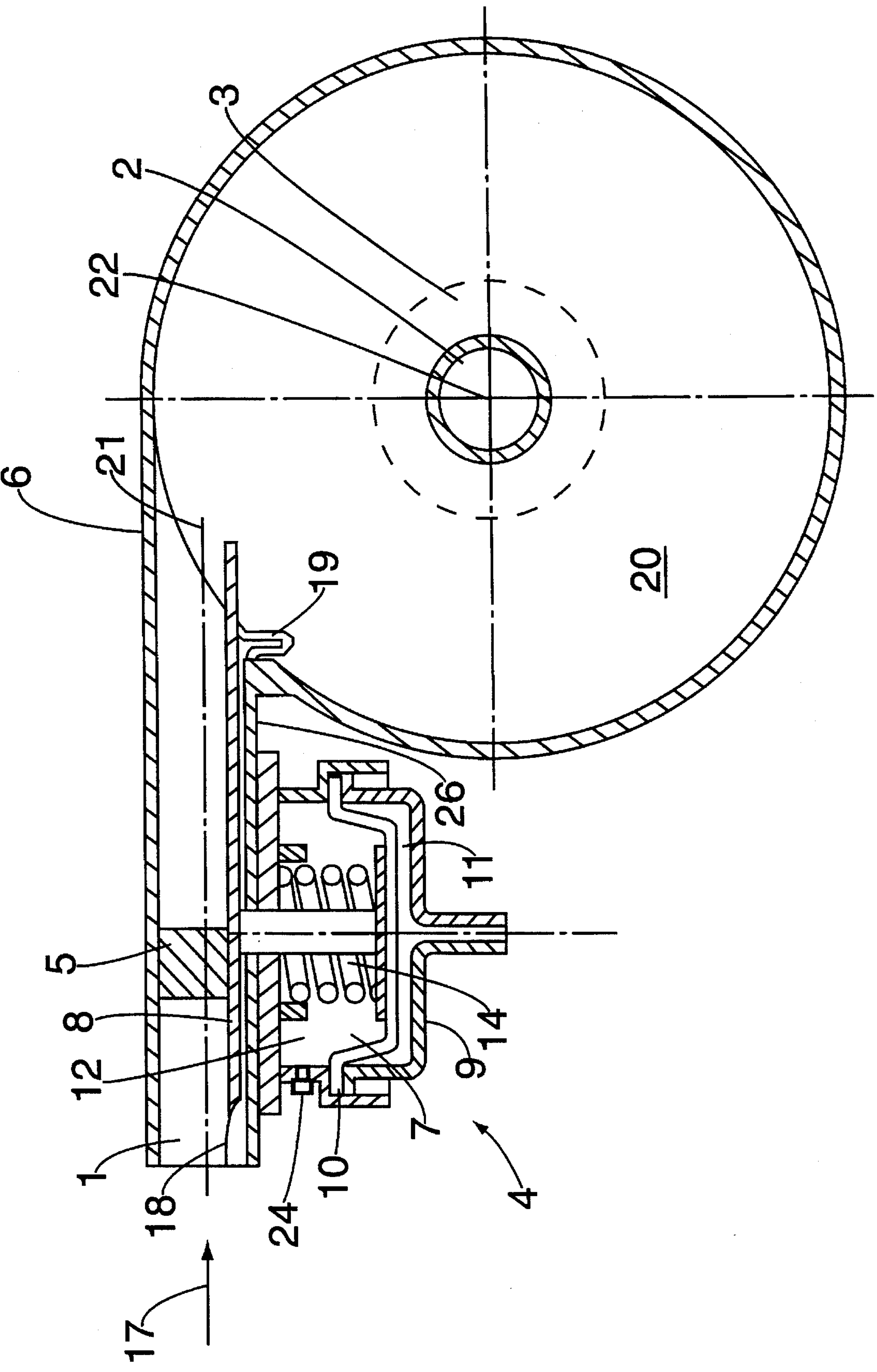
FIG. 2 is a sectional view of a second embodiment of the liquid separator, configured for use with an Otto combustion engine without supercharging at full throttle.

According to another embodiment of the invention, illustrated in FIG. 2, the pressure assembly 7 can be provided with a vacuum connection port 24 connected to the chamber 12 such that it is in direct pneumatic communication with chamber containing the spring 14. Such a design is advantageous for use with Otto combustion type engines, since, depending upon the load, a variable amount of vacuum is available within the induction pipe of the combustion engine. At full throttle, when the throttle valves are almost completely open, the vacuum within the induction pipe is at a minimum, so that the helical compression spring 14 moves the control element over into the open position of the inlet orifice. In idling range or part throttle, on the other hand, when there is a comparatively greater vacuum in the induction pipe, the control element is moved against the spring tension within the opening by the vacuum pressurization, so that the passage cross-section is relatively reduced in size.

According to a further refinement, the first and the second outlets 2 and 3, which can form a component of a cyclone, surround a common axis 22 in a concentrical manner. Advantageously, the second outlet 3 projects at least to the level of the inlet orifice in the cyclone. The cyclone itself can be made of a polymer material which is resistent to the flow medium.

What is claimed is:

1. An apparatus for separating liquids from gases, comprising:

an inlet orifice to receive a gas liquid mixture, said inlet orifice leading to a generally tubular conduit defining a tubular passage that is partially bounded along its entire length by a dimensionally stable wall;

an adjusting mechanism for varying the cross-sectional area of the tubular passage in the area of the inlet orifice, said adjusting mechanism comprising a pneumatically operable control element that is shiftable within the tubular conduit so that, in combination with the dimensionally stable wall, it defines a tubular passage of variable cross-section;

a pressure control assembly comprising a pressure responsive elastomeric rolling diaphragm; a housing, said housing being partitioned by the rolling diaphragm into two chambers separated from each other in a gas-tight manner, wherein the rolling diaphragm is connected to the pneumatically operable control element so that movement of the diaphragm causes movement of the control element;

a cyclone separator for receiving fluid from the tubular conduit, said cyclone separator having a first outlet for the liquid and a second outlet for the gas after the two have been separated from one another;

wherein the pressure control assembly is arranged opposite the dimensionally stable wall and the control element penetrates into the space of the tubular conduit in a gas-tight manner.

2. An apparatus as set forth in claim 1, wherein the shape of the control element is essentially lamellar.

3. An apparatus as set forth in claim 1, wherein the control element is sealingly connected to a fixed inner wall forming a part of the tubular conduit in a manner that prevents fluid flow from circumventing the variable constriction presented by the control element.

4. An apparatus as set forth in claim 1, wherein the inlet orifice leads into the cyclone separator and the first outlet whose cross-sectional area decreases in a staged manner, and wherein the inlet orifice and cyclone separator have primary axes of symmetry that are essentially perpendicular to one another.

5. An apparatus as set forth in claim 1, wherein a helical spring is located in one of the two chambers and the pressure control assembly includes a port for connection to a source of pressure which is connected to that chamber which does not contain the helical spring.

6. An apparatus as set forth in claim 1, in which the apparatus is configured to be attached to the crankcase ventilation of a combustion engine.

7. An apparatus for the separation of liquids from gases, comprising:

an inlet orifice to receive a gas-liquid mixture, said inlet orifice leading to a generally tubular conduit defining a tubular passage that is partially bounded along its entire length by a dimensionally stable outer wall and an inner wall;

an adjusting mechanism for varying the effective cross-sectional area of the tubular passage in the area of the inlet orifice, said adjusting mechanism comprising a pressure responsive element connected to a pneumatically operable control element that is shiftably arranged within the tubular conduit so that it is sealingly connected to the tubular conduit via elastically flexible sealing strips that are arranged to be diagonal with respect to the direction of fluid flow both into and out of the tubular conduit so that, in combination with the dimensionally stable wall, it defines a tubular passage of variable cross-section; and a cyclone for receiving fluid from the tubular conduit, said cyclone having a first outlet for the liquid and a second outlet for the gas after the two have been separated from one another.

8. An apparatus as set forth in claim 7, wherein the shape of the control element is essentially lamellar.

9. An apparatus as set forth in claim 7, wherein first outlet of the cyclone has a cross-sectional area which decreases in a staged manner, and wherein the tubular conduit and cyclone have primary axes of symmetry that are essentially perpendicular to one another.

10. An apparatus as set forth in claim 7, wherein the pressure control assembly is provided with a port for connection to a source of vacuum which is connected to a chamber containing a helical spring.

* * * * *